United States Patent
Kim et al.

(10) Patent No.: US 7,804,401 B2
(45) Date of Patent: Sep. 28, 2010

(54) APPARATUS AND METHOD FOR RECOGNIZING SURROUNDING STATE

(75) Inventors: Su Myeon Kim, Suwon-si (KR); Jin Wook Lee, Yongin-si (KR); Hun Lim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 466 days.

(21) Appl. No.: 11/753,646

(22) Filed: May 25, 2007

(65) Prior Publication Data

US 2008/0143520 A1 Jun. 19, 2008

(30) Foreign Application Priority Data

Dec. 13, 2006 (KR) .................. 10-2006-0127172

(51) Int. Cl.
*G08B 26/00* (2006.01)
*G05B 19/00* (2006.01)
*H04B 1/00* (2006.01)

(52) U.S. Cl. .............. 340/505; 340/5.92; 340/572.1; 705/22; 235/385

(58) Field of Classification Search .......... 340/505, 340/5.92
See application file for complete search history.

(56) References Cited

U.S. PATENT DOCUMENTS 6,486,780 B1 * 11/2002 Garber et al. ............ 340/572.1
6,600,418 B2 * 7/2003 Francis et al. ............ 340/572.1
7,061,376 B2 6/2006 Wang et al.
7,423,525 B2 * 9/2008 Bandy ....................... 340/505
2003/0216969 A1 * 11/2003 Bauer et al. ................... 705/22

FOREIGN PATENT DOCUMENTS

| | | |
|---|---|---|
| JP | 2001-256448 A | 9/2001 |
| JP | 2004078779 A | 3/2004 |
| KR | 10-2001-0054241 A | 7/2001 |
| KR | 10-0364451 B1 | 11/2002 |
| KR | 10-2004-0029636 A | 4/2004 |
| KR | 10-2005-0051917 A | 6/2005 |
| KR | 10-0585347 B1 | 5/2006 |
| KR | 10-2006-0068518 A | 6/2006 |
| KR | 1020060123625 A | 12/2006 |
| KR | 1020070056673 A | 6/2007 |

* cited by examiner

*Primary Examiner*—Donnie L Crosland
(74) *Attorney, Agent, or Firm*—Sughrue Mion, PLLC

(57) ABSTRACT

An apparatus and method of recognizing a surrounding state are provided. The apparatus for recognizing a surrounding state includes: a unique information obtaining unit which obtains, from a peripheral device, unique information of the peripheral device; and a surrounding state determining unit which determines a surrounding state, based on the unique information.

16 Claims, 12 Drawing Sheets

FIG. 6

| TYPE OF PERIPHERAL DEVICE | COMPUTER, TV, TELEPHONE, DVD PLAYER, REFRIGERATOR, AND THE LIKE |
|---|---|
| MODEL NAME OF PERIPHERAL DEVICE | VGX-XL2, LN-S3241D, 27933GE2, DVD-HD960, RM255BARB, AND THE LIKE |
| MANUFACTURER | A CO., B CO., C CO., B CO., AND THE LIKE |
| PRODUCTION YEAR | 2006, 2005, 2003, 2004, 2004, AND THE LIKE |
| OWNER | CHULSOO KIM, CHULSOO KIM, YOUNGHEE LEE, YOUNGHEE LEE, CHULSOO KIM, AND THE LIKE |

FIG. 7
700

| PERIPHERAL DEVICE (NUMBER) | STATE INFORMATION (RELIABILITY) |
|---|---|
| VCR(1), D-TV(1), AMP(1), SETTOP BOX(1) | LIVING ROOM (90%) |
| DESKTOP(1), WIRED PHONE(1) | OFFICE DEST (60%) |
| NOTEBOOK(N), BEAM PROJECTOR(1), SCREEN(1) | SEMINAR ROOM (70%) |
| BUS(1), MOBILE PHONE(N) | IN THE BUS (80%) |
| PUBLIC PHONE(2), MOBILE PHONE(N) | STREET (70%) |

701 — PERIPHERAL DEVICE (NUMBER) column
702 — STATE INFORMATION (RELIABILITY) column

UNIQUE INFORMATION OF PERIPHERAL DEVICE (TYPE, MANUFACTURER, PRODUCTION YEAR)

1. BEAM PROJECTOR, B CO., 2005
2. NOTEBOOK, A CO., 2004
3. NOTEBOOK, A CO., 2005
4. NOTEBOOK, B CO., 2004
5. ELECTRICALLY-POWERED SCREEN, C CO., 2004

→ RECOGNIZE CURRENT STATE AS BEING IN SEMINAR ROOM (OR DURING SEMINAR) WITH BEAM PROJECTOR, ELECTRICALLY-POWERED SCREEN, AND PLURALITY OF PORTABLE DEVICES

801

901

UNIQUE INFORMATION OF PERIPHERAL DEVICE
(TYPE, MANUFACTURER, PRODUCTION YEAR)

1. BODY OF DESKTOP, A CO., 2003
2. LCD MONITOR, A CO., 2003
3. DESK TELEPHONE, A CO., 2003

↑ RECOGNIZE CURRENT STATE AS BEING IN EITHER PRIVATE ROOM OF HOME, OR OFFICE. CURRENT STATE MAY BE DETERMINED AS BEING IN OFFICE ACCORDING TO CURRENT LOCATION INFORMATION

APPARATUS AND METHOD FOR RECOGNIZING SURROUNDING STATE

CROSS-REFERENCE TO RELATED APPLICATION

This application claims priority from Korean Patent Application No. 10-2006-0127172, filed on Dec. 13, 2006, in the Korean Intellectual Property Office, the entire disclosure of which is incorporated herein by reference.

BACKGROUND OF THE INVENTION

1. Field of the Invention

Methods and apparatuses consistent with the present invention relate to an apparatus and method of recognizing a surrounding state, and more particularly, to an apparatus and method which can recognize a surrounding state using unique information of a peripheral device (e.g. a type, a model name, a model number, a serial number, a manufacturer, a production year, an owner, an identifier, and the like).

2. Description of Related Art

Facing a ubiquitous period, many services are expected to be operated according to recognized states. A state recognition technology is required and is the most fundamental technology for many services. The technology corresponds to a technology in which a user analogizes, from low-level sensing data (e.g. a location, a speed, a heart rate, and the like), in various methods, a physical and logical state in which the user is currently placed.

Currently, it is generally common to use information which a user directly provides, for example, sensing information or schedule information transmitted from a physical sensor for state recognition. FIG. 1 is a diagram illustrating a state recognition device according to a related art. In this instance, a surrounding state may be recognized using information obtained from a peripheral sensor, and information provided from a user, as illustrated in FIG. 1.

However, various sensors are required for actually using the state recognition technology. For example, a global positioning system (GPS) is sufficient for merely checking a current location. An additional sensor, such as a gyro sensor, is required for checking a location in a building. Using the sensors causes additional costs and a power consumption problem in operation. Also, since a sensor which is not common is required to be installed, the state recognition technology may not be used for existing devices. Specifically, a new device for recognizing a surrounding state is required.

SUMMARY OF THE INVENTION

The present invention provides an apparatus and method of recognizing a surrounding state, which can perform simple state recognition using unique information of a peripheral device (e.g. a type, a model name, a model number, a serial number, a manufacturer, a production year, an owner, an identifier, and the like).

The present invention also provides an apparatus and method of recognizing a surrounding state, which can obtain detailed information with respect to a peripheral device from either a web page or a radio frequency identification (RFID)-based database connected with the peripheral device via the unique information, thereby increasing the accuracy of state recognition.

According to an aspect of the present invention, there is provided an apparatus for recognizing a surrounding state, the apparatus including: a unique information obtaining unit which obtains, from a peripheral device, unique information of the peripheral device; and a surrounding state determining unit which determines a surrounding state, based on the unique information. In this instance, the unique information may include a type of the peripheral device, a model name, a model number, a serial number, a manufacturer, a production year, an owner, and an identifier.

In this instance, the unique information obtaining unit may include an RFID reader, and the RFID reader may obtain the unique information via an RFID tag included in the peripheral device.

Also, the unique information obtaining unit may include a wired/wireless communication module, and the wired/wireless communication module may obtain the unique information via the wired/wireless communication module included in the peripheral device.

Also, the unique information obtaining unit may include a detailed information obtaining unit which obtains, via the unique information, detailed information of the peripheral device, and the surrounding state determining unit may redefine the unique information, based on the detailed information, and determine the surrounding state, based on the redefined unique information. In this instance, the detailed information obtaining unit may obtain, via the unique information, the detailed information using either a web page or an RFID-based database connected with the peripheral device.

According to another aspect of the present invention, there is provided a surrounding state recognition method of recognizing a surrounding state in a device, the method including: obtaining unique information from a peripheral device; and determining a surrounding state, based on the unique information.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which:

FIG. 6 illustrates unique information of a peripheral device according to an exemplary embodiment of the present invention;

FIG. 7 illustrates state recognition according to a type and a number of a peripheral device according to an exemplary embodiment of the present invention;

DETAILED DESCRIPTION OF EXEMPLARY EMBODIMENTS OF THE INVENTION

Figure 1:
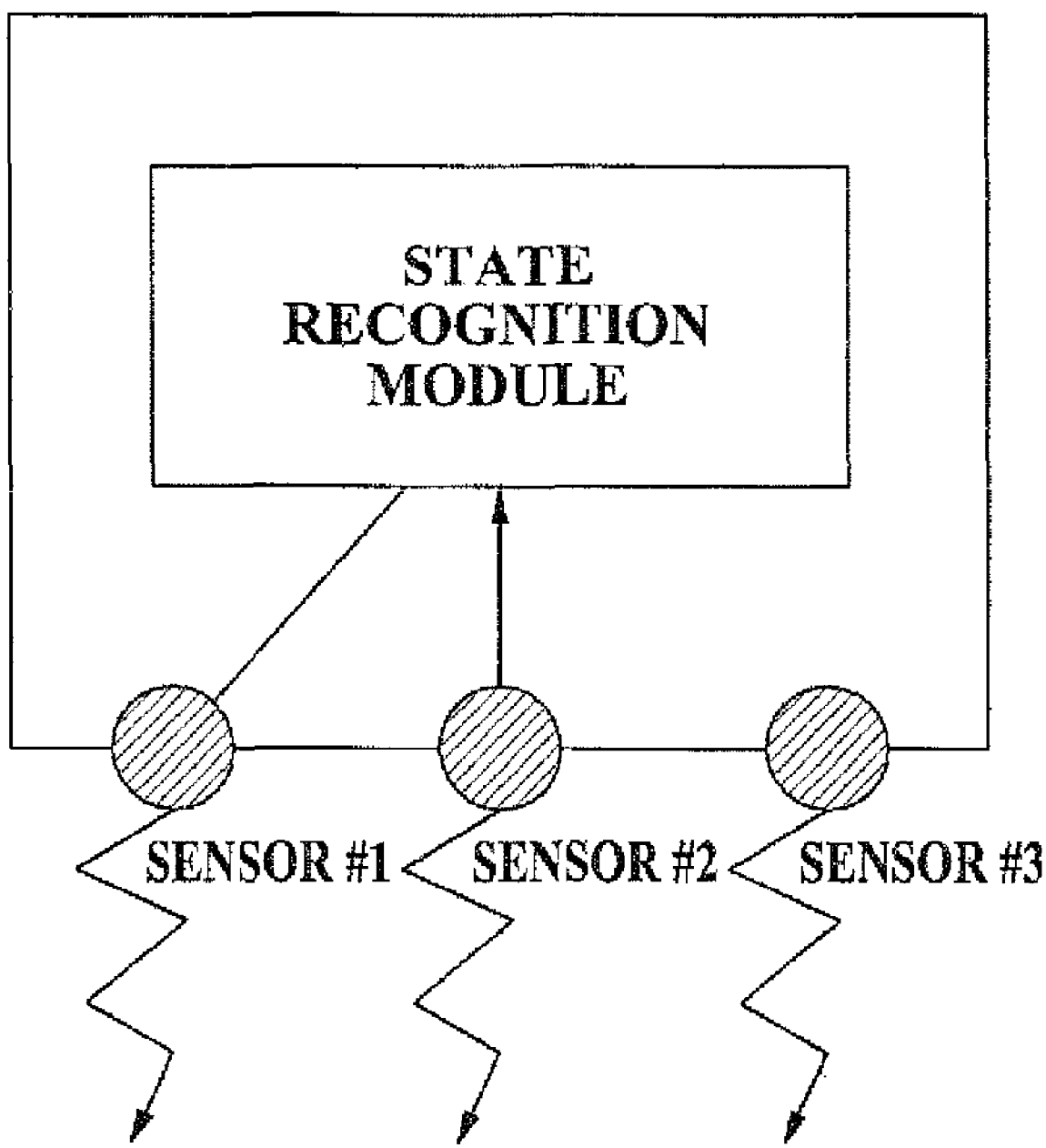
FIG. 1 is a diagram illustrating a state recognition device according to a related art.

Reference will now be made in detail to exemplary embodiments of the present invention, examples of which are illustrated in the accompanying drawings, wherein like reference numerals refer to like elements throughout. The exemplary embodiments are described below in order to explain the present invention by referring to the figures.

Figure 2:
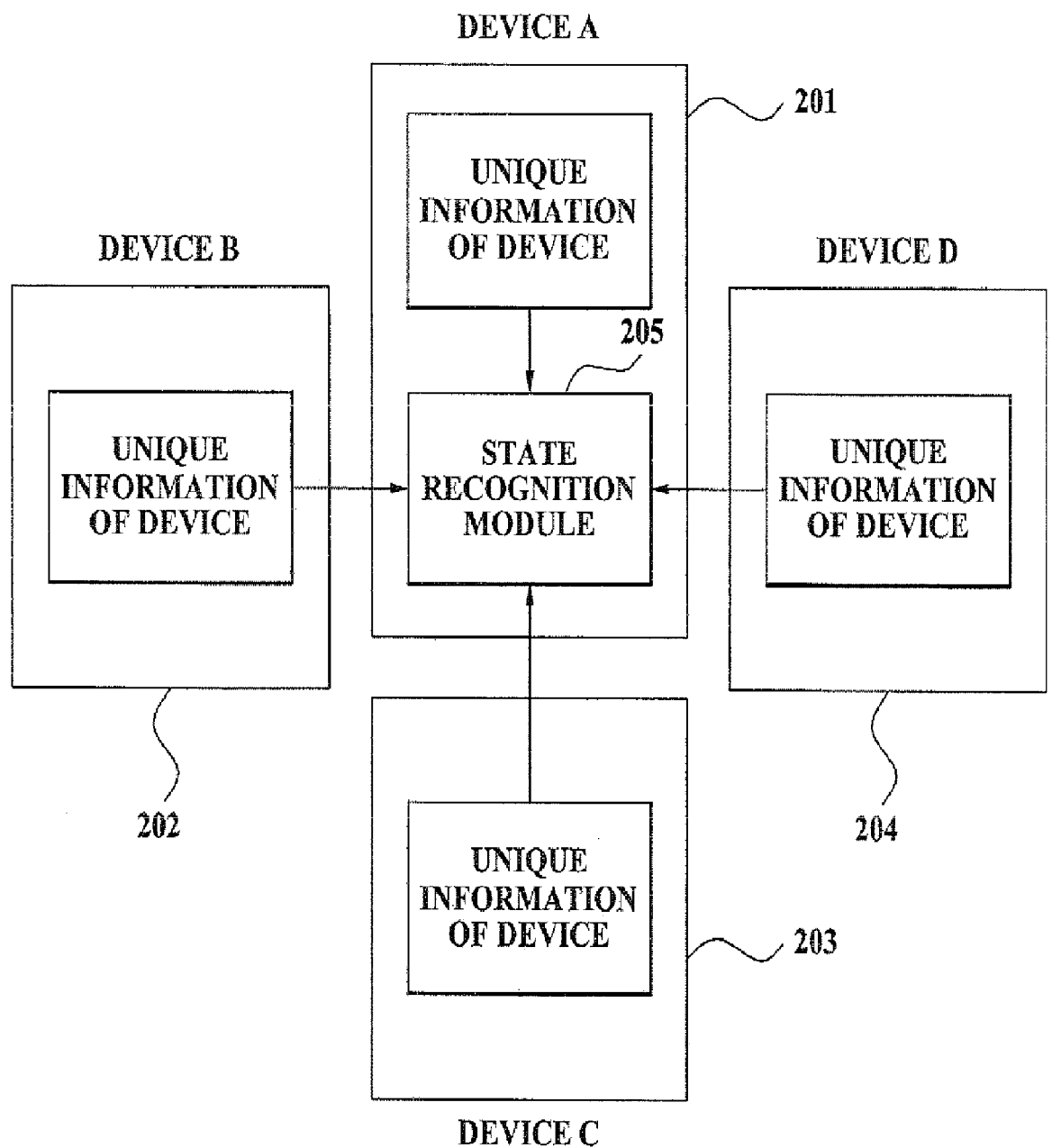
FIG. 2 is a diagram illustrating an apparatus for recognizing a surrounding state according to an exemplary embodiment of the present invention.

FIG. 2 is a diagram illustrating an apparatus for recognizing a surrounding state according to an exemplary embodiment of the present invention.

Similar to the description above, methods and apparatuses consistent with the present invention relate to an apparatus and method, which can obtain unique information from a peripheral device, analyze the unique information, and recognize a surrounding state. In this instance, a device A 201 may include a state recognition module 205 for obtaining, from peripheral device B 202, peripheral device C 203, and peripheral device D 204, unique information, and performing state recognition. The unique information may include a type of the peripheral devices 202 through 204, a model name, a model number, a serial number, a manufacturer, a production year, an owner, an identifier, and the like.

Specifically, all devices in which recognizing a surrounding state is required, may include a state recognition module which may perform state recognition using unique information of a peripheral device. In FIGS. 3 through 8, the apparatus for recognizing a surrounding state is described in detail.

Figure 3:
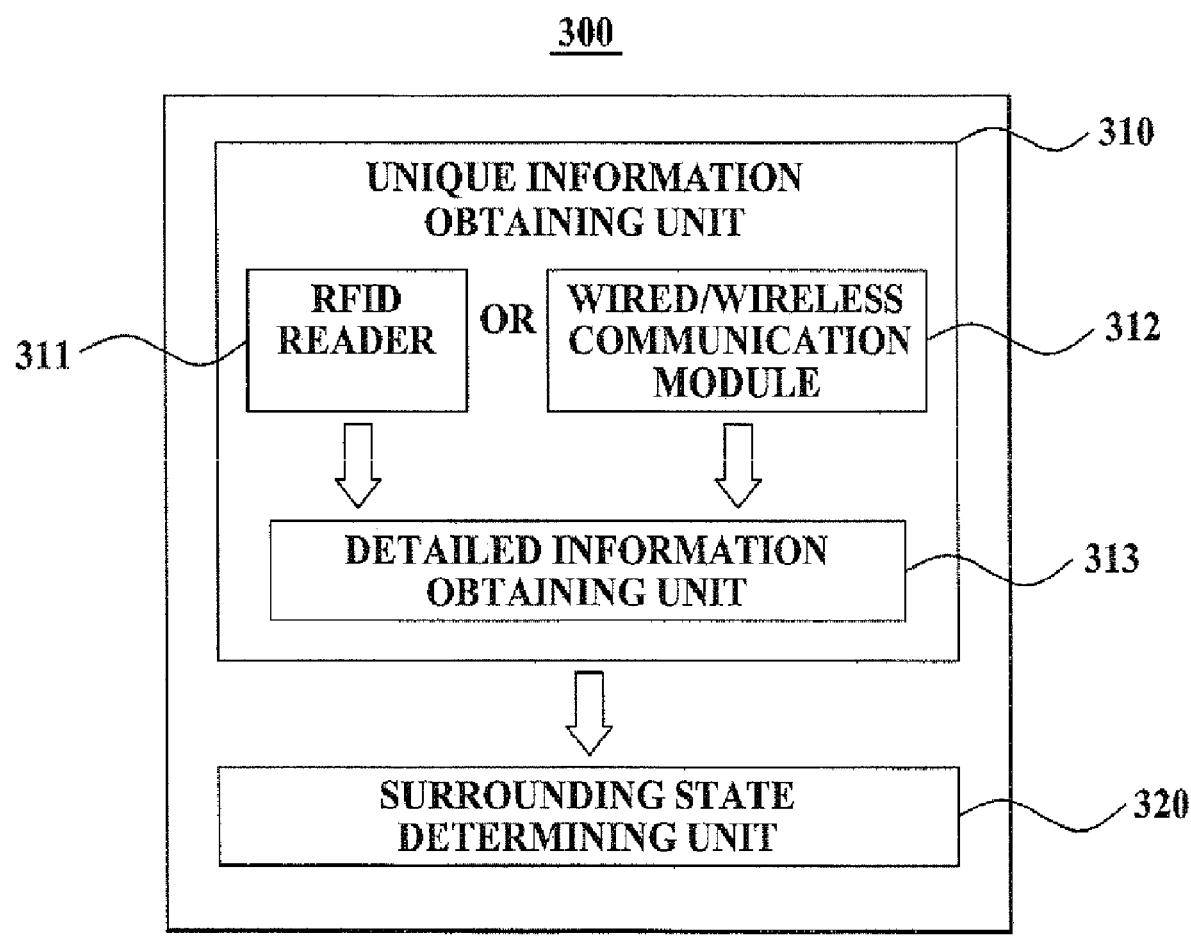
FIG. 3 is a block diagram illustrating an internal configuration of an apparatus for recognizing a surrounding state according to an exemplary embodiment of the present invention.

FIG. 3 is a block diagram illustrating an internal configuration of an apparatus for recognizing a surrounding state according to an exemplary embodiment of the present invention. As illustrated in FIG. 3, a device 300 may include a unique information obtaining unit 310 and a surrounding state determining unit 320.

The unique information obtaining unit 310 obtains, from a peripheral device, unique information of the peripheral device. In this instance, the unique information obtaining unit 310 may include a radio frequency identification (RFID) reader 311, and the RFID reader 311 may obtain the unique information via an RFID tag included in the peripheral device.

Figure 4:
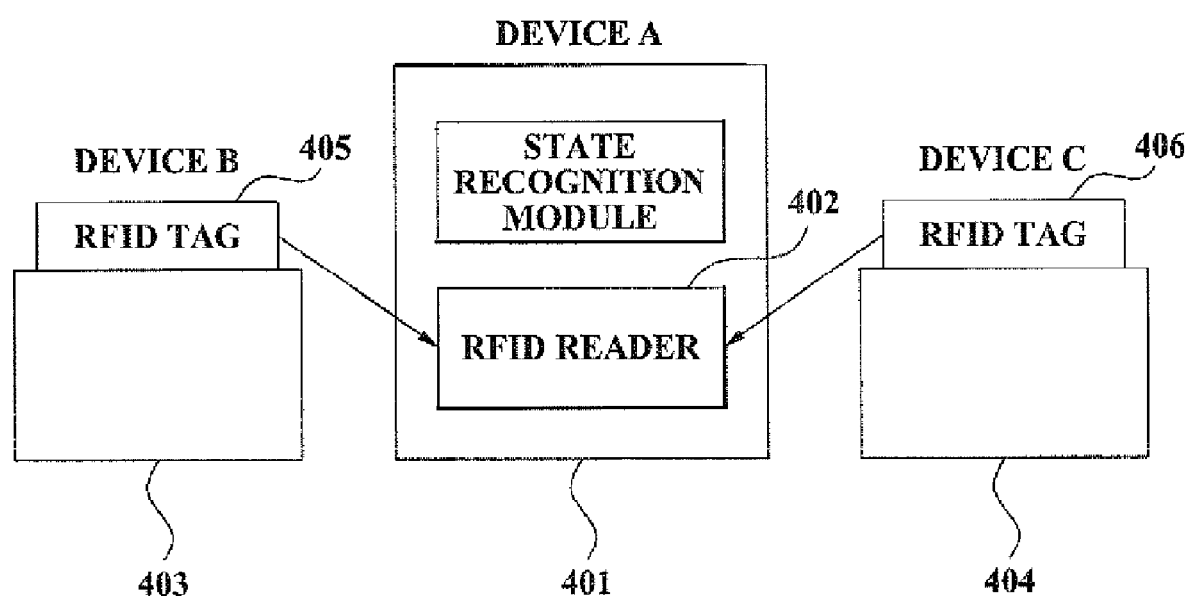
FIG. 4 illustrates an example of a method of obtaining unique information according to an exemplary embodiment of the present invention.

FIG. 4 illustrates an example of a method of obtaining unique information according to an exemplary embodiment of the present invention. A device A 401 may include an RFID reader 402, and peripheral device B 403 and peripheral device C 404 of the device A 401 may respectively include RFID tags 405 and 406. In this instance, all unique information of peripheral device B 403 and peripheral device C 404 may be included in the RFID tags 405 and 406, respectively, and the device A 401 may obtain the unique information by reading RFID tags 405 and 406 via the RFID reader 402.

Also, the unique information obtaining unit 310 may include a wired/wireless communication module 312, and the wired/wireless communication module 312 may obtain the unique information via the wired/wireless communication module included in the peripheral device.

Figure 5:
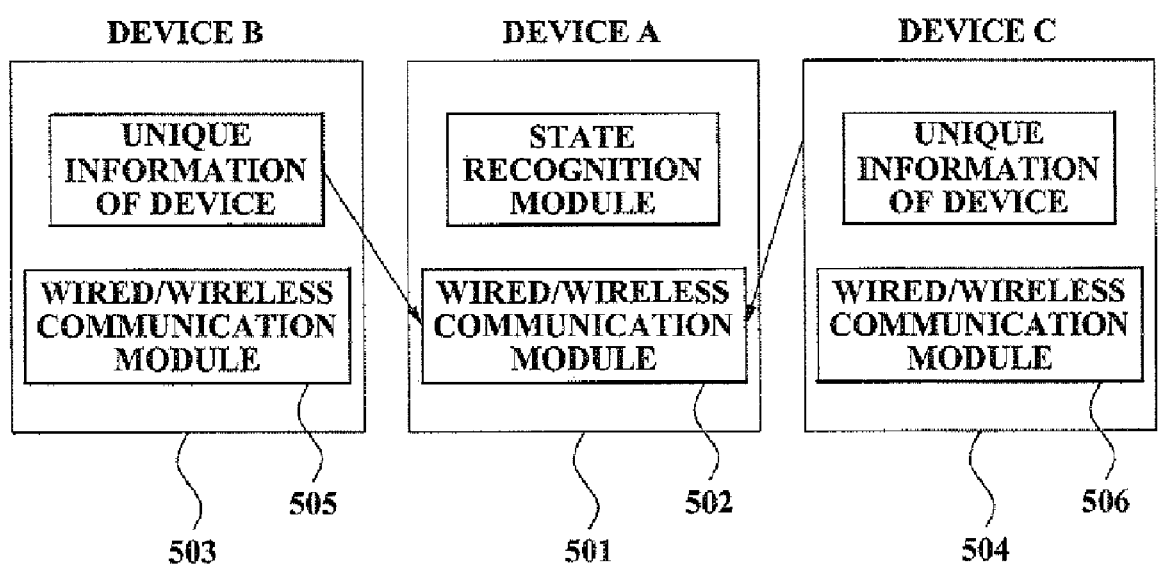
FIG. 5 illustrates another example a method of obtaining unique information according to another exemplary embodiment of the present invention.

FIG. 5 illustrates another example a method of obtaining unique information according to another exemplary embodiment of the present invention. A device A 501 may include a wired/wireless communication module 502, and peripheral device B 503 and peripheral device C 504 of the device A 501 may respectively include wired/wireless communication modules 505 and 506. In this instance, the device A 501 may directly perform a communication with the wired/wireless communication modules 505 and 506 of peripheral device B 503 and peripheral device C 504 using the wired/wireless communication module 502, and obtain unique information of the peripheral device B 503 and peripheral device C 504.

A process of obtaining the unique information may be performed in a form in which the peripheral devices 503 and 504 transmit a response message including the unique information when the device 501 transmits a request message to the peripheral devices 503 and 504.

The unique information may include information input when the peripheral device is manufactured, e.g. a type of the peripheral device, a model name, a model number, a serial number, a manufacturer, a production year, and the like, and information established by a user, e.g. an owner, or an identifier.

FIG. 6 illustrates unique information of a peripheral device according to an exemplary embodiment of the present invention. As illustrated in FIG. 6, the unique information may be used for state recognition of the device 300. For example, when a type of a peripheral device corresponds to "a washer", the device 300 may recognize a current surrounding state as "laundry", "a laundry room", and the like.

Also, the unique information obtaining unit 310 may include a detailed information obtaining unit 313 which obtains detailed information of the peripheral device via the unique information, and the detailed information obtaining unit 313 may obtain the detailed information using either a web page or an RFID-based database connected to the peripheral device via the unique information. When either a model name of the peripheral device or a manufacturer is recognized using an example of "the washer" described above, the device 300 may visit a home page of the manufacturer of the peripheral device, and obtain detailed specifications with respect to the peripheral device.

The obtained specifications may be used for improving a quality of state recognition. Specifically, when "the washer" corresponds to "a home-use washer", the device 300 may recognize a current surrounding state as "the laundry room".

A surrounding state determining unit 320 determines a surrounding state, based on the unique information. In this instance, the surrounding state determining unit 320 may redefine the unique information, based on the detailed information, and determine the surrounding state, based on the redefined unique information.

FIG. 7 illustrates state recognition according to a type and a number of a peripheral device according to an exemplary embodiment of the present invention. Table 700 illustrates a database illustrating a peripheral device 701 including a type and a number, and state information 702 including reliability according thereto.

For example, a device including one bus and a plurality of mobile phones as a peripheral device 701 may recognize a current state as being on the bus with reliability corresponding to 80%. The database may change the state information and the reliability via a subsequent learning process, and improve accuracy of recognizing the state information and the corresponding reliability using the detailed information described above.

Figure 8:
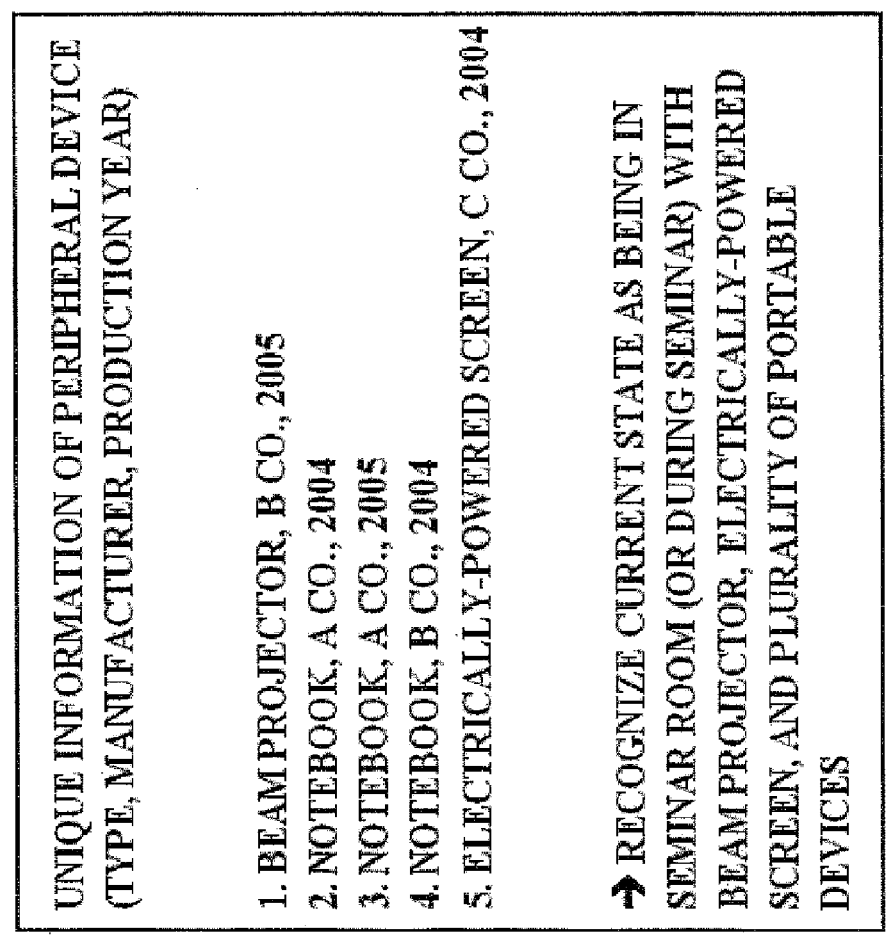
FIG. 8 illustrates an example of state recognition using unique information according to an exemplary embodiment of the present invention.
Figure 8:
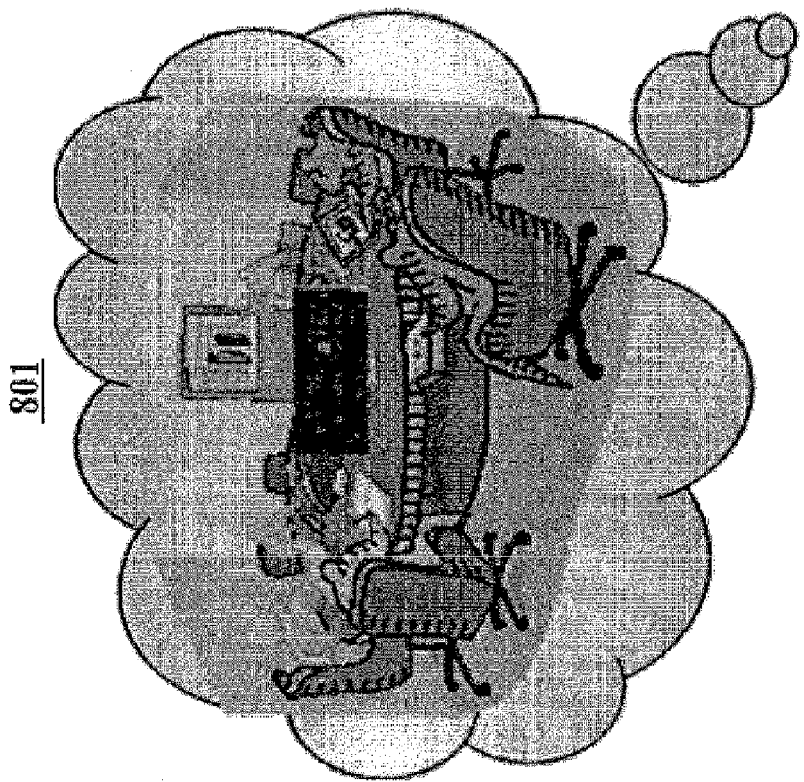

FIG. 8 illustrates an example of state recognition using unique information according to an exemplary embodiment of the present invention. As illustrated in FIG. 8, an illustration 801 illustrates a state in which a beam projector, an electrically-powered screen, and a plurality of notebooks exist as peripheral devices. Specifically, a surrounding state which may be recognized by a configuration of the peripheral device, as constructed above, may include a seminar room with reference to FIG. 7.

Figure 9:
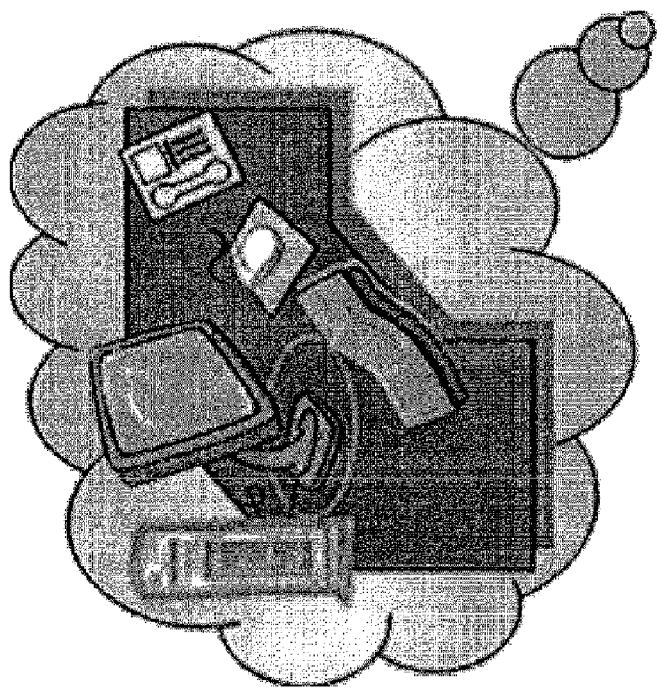
FIG. 9 illustrates another example of state recognition using unique information according to an exemplary embodiment of the present invention.

FIG. 9 illustrates another example of state recognition using unique information according to an exemplary embodiment of the present invention. As illustrated in FIG. 9, an illustration 901 illustrates a state in which a desktop, a liquid crystal display (LCD) monitor, and a wired telephone exist as peripheral devices. Specifically, a surrounding state which may be recognized by a configuration of the peripheral device, as constructed above, may be either a desk in an office, or a desk in a home. In this instance, information of a peripheral device includes more detailed contents (for example, an owner). When an owner of a peripheral device in an office is a company, and an owner of a peripheral device in a home is an individual, a device may recognize whether a current state corresponds to be either a desk in an office, or a desk in a home.

According to an exemplary embodiment of the present invention, there is provided an apparatus for recognizing a surrounding state, which can perform simple state recognition using unique information of a peripheral device (e.g. a type, a model name, a model number, a serial number, a manufacturer, a production year, an owner, an identifier, and the like).

Also, according to an exemplary embodiment of the present invention, there is provided an apparatus for recognizing a surrounding state, which can obtain detailed information with respect to a peripheral device from either a web page or an RFID-based database connected to the peripheral device via unique information, thereby increasing the accuracy of state recognition.

Figure 10:
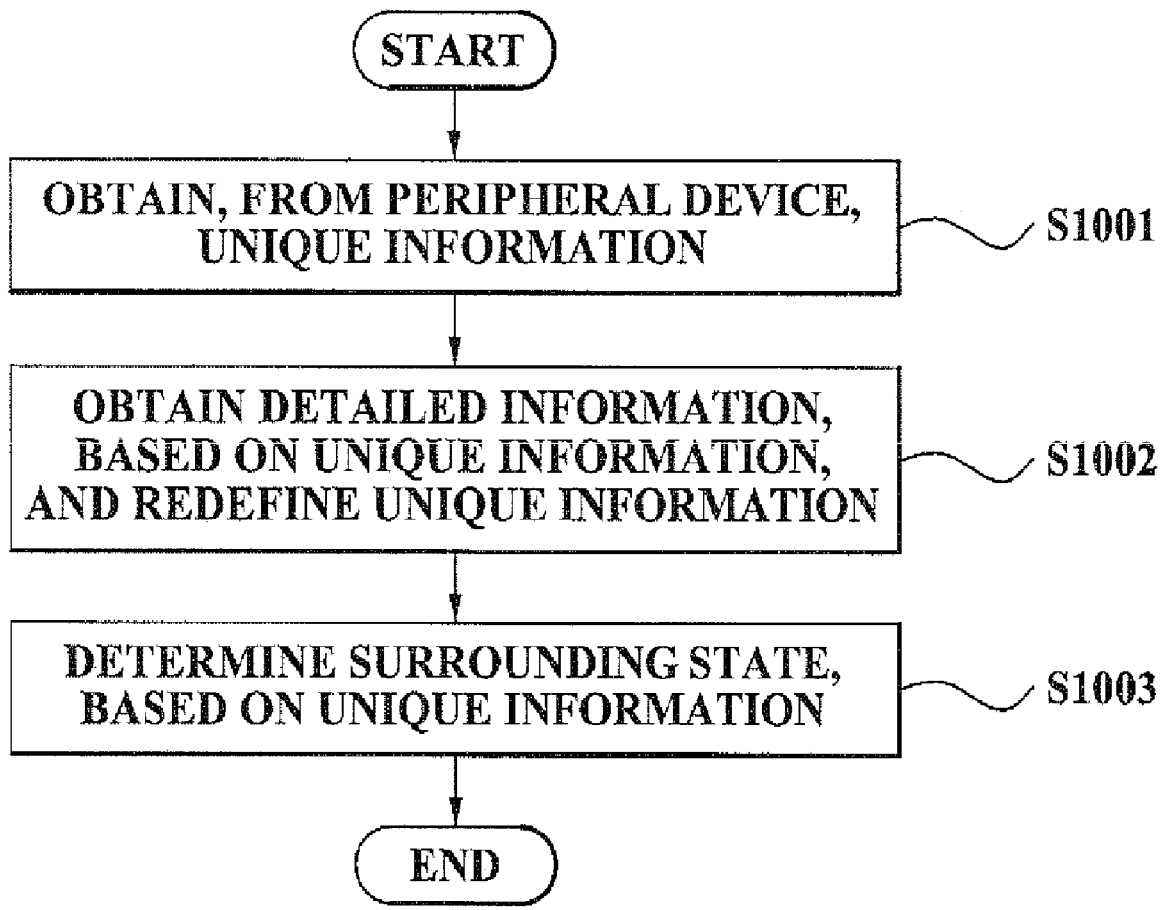
FIG. 10 is a flowchart illustrating a method of recognizing a surrounding state according to an exemplary embodiment of the present invention.

FIG. 10 is a flowchart illustrating a method of recognizing a surrounding state according to an exemplary embodiment of the present invention.

In operation S1001, an apparatus for recognizing a surrounding state obtains, from a peripheral device, unique information. In this instance, the unique information may include a type of the peripheral device, a model name, a model number, a serial number, a manufacturer, a production year, an owner, an identifier, and the like. Also, the peripheral device may include an RFID tag. Specifically, the unique information included in the RFID tag may be obtained via an RFID reader, in operation S1001.

Also, the peripheral device may include a wired/wireless communication module. In this instance, the unique information may be obtained using the wired/wireless communication module, in operation S1001.

In operation S1002, the apparatus obtains detailed information of the peripheral device, based on the unique information, and redefines the unique information, based on the detailed information. Specifically, the detailed information may be obtained using either a web page or an RFID-based database connected to the peripheral device via the unique information, and the unique information may be redefined via the detailed information and the unique information, in operation S1002.

In operation S1003, the apparatus determines a surrounding state, based on the unique information. Specifically, the apparatus may determine a current surrounding state using either unique information obtained from the peripheral device, or the unique information redefined via the detailed information. In this instance, the apparatus may analyze the unique information, thereby inferring a current state for state recognition.

Figure 11:
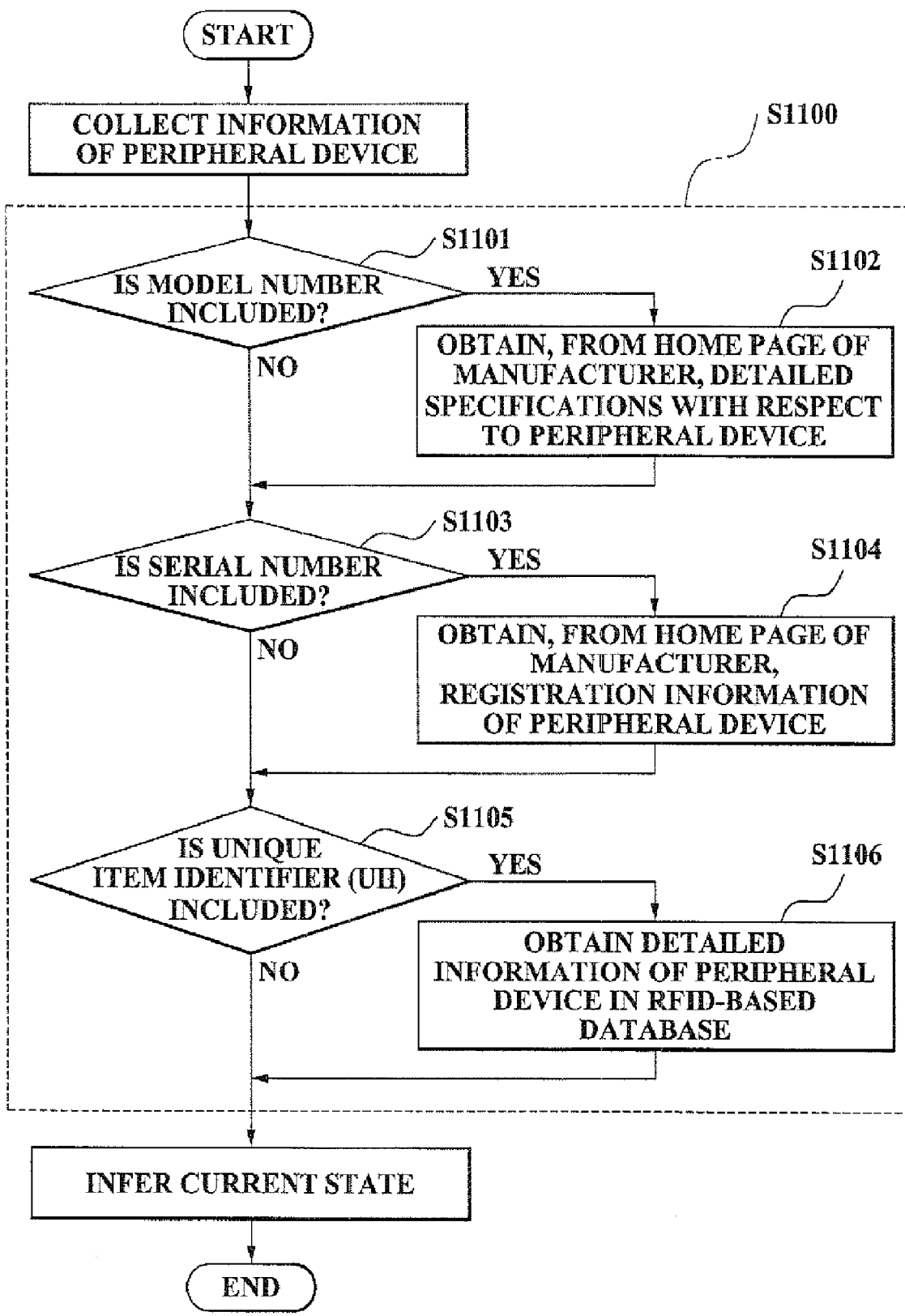
FIG. 11 is a flowchart illustrating a method of obtaining detailed information, and redefining unique information according to an exemplary embodiment of the present invention.

FIG. 11 is a flowchart illustrating a method of obtaining detailed information, and redefining unique information according to an exemplary embodiment of the present invention.

An apparatus may obtain unique information of a peripheral device. According to operation S1100, the apparatus may obtain detailed information of the peripheral device via the unique information, and redefine the unique information. Also, the apparatus may infer a current state using the redefined unique information, and perform state recognition.

In operation S1100, the detailed information may be obtained via operations S1101 through 1106, as illustrated in FIG. 11. In this instance, operations S1101 through 1106 are exemplary of possible methods for obtaining the detailed information.

In operation S1101, the apparatus may check whether the unique information includes a model number of the peripheral device. When the unique information includes a model number, the apparatus may be connected to a home page of a manufacturer of the peripheral device, and may obtain specifications with respect to the peripheral device as the detailed information in operation S1102.

Also, the apparatus may check whether the unique information includes a serial number of the peripheral device, in operation S1103. When the unique information includes a serial number, the apparatus may be connected to a home page of a manufacturer of the peripheral device, and may obtain registration information of the peripheral device as the detailed information in operation S1104.

Also, the apparatus may check whether the unique information includes a unique item identifier (UII) applied to an RFID of the peripheral device, in operation S1105. When the unique information includes a UII, the apparatus may obtain detailed information of the peripheral device in an RFID-based database as the detailed information in operation S1106.

Similar to the description above, the detailed information may be included in the unique information, and thereby the unique information may be redefined.

Figure 12:
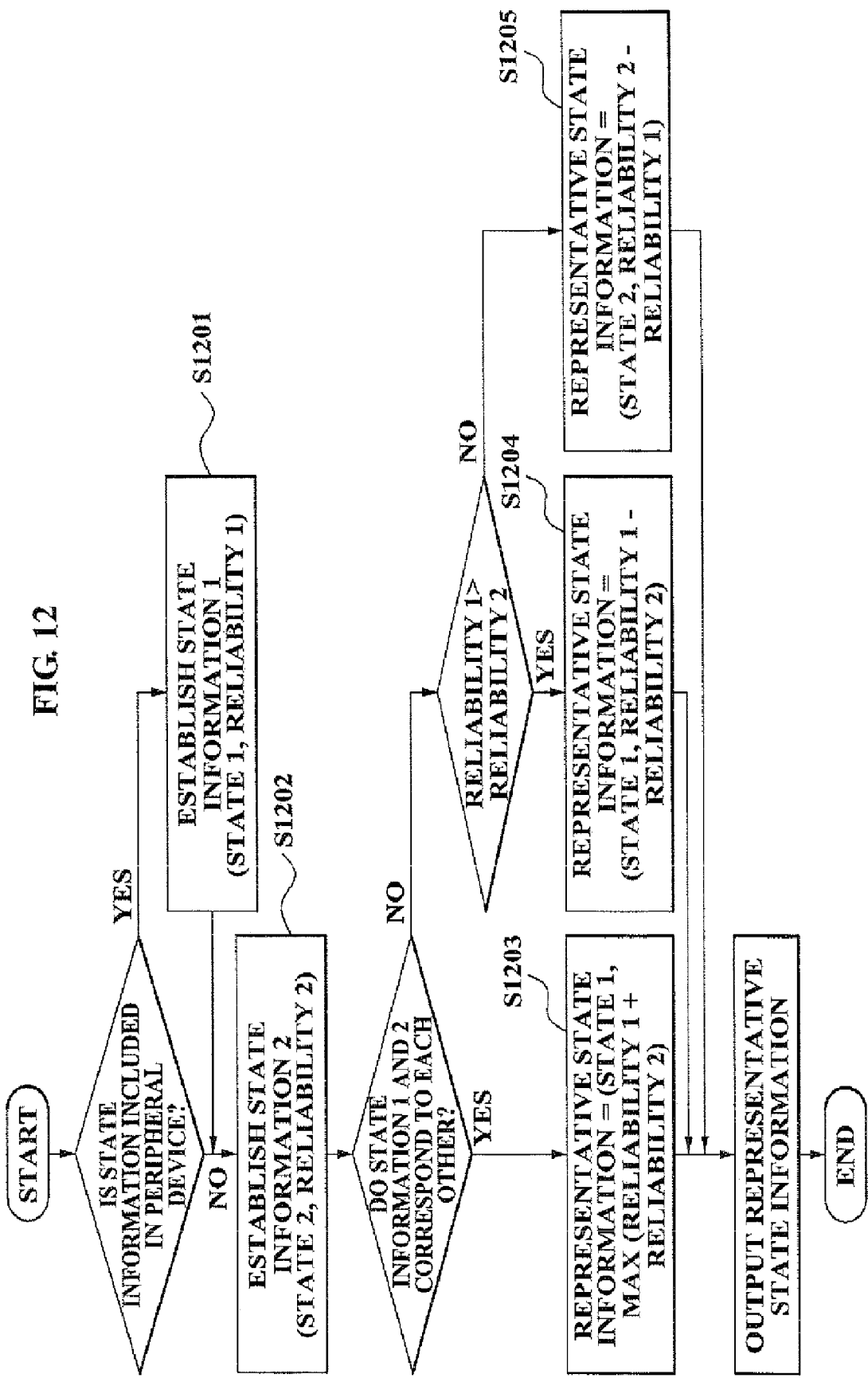
FIG. 12 is a flowchart illustrating a state inference method for state recognition according to an exemplary embodiment of the present invention.

FIG. 12 is a flowchart illustrating a state inference method for state recognition according to an exemplary embodiment of the present invention.

In operation S1201, the apparatus may establish state information "1" which may be directly inferred from the unique information which is previously obtained. Specifically, when detailed information such as "a living room-use video tape recorder (VTR)", and the like is included in the obtained unique information, the apparatus may first infer a current state as being in "a living room (state '1')", and establish reliability "1" with respect to the state "1".

Also, in operation S1202, the apparatus may establish state information "2" using information with respect to a type and a number of the peripheral device via a database as illustrated in FIG. 7, similar to the illustrations of FIGS. 8 and 9. In this instance, the apparatus may establish a state "2" using the information with respect to the type and the number, and establish reliability "2" with respect to the state "2".

In this instance, the apparatus may obtain representative state information using two pieces of state information (state information "1" and state information "2"). Also, the apparatus may determine whether the two pieces of state information correspond to each other, and when the two pieces of state information correspond to each other, i.e. when same states are shown, the state information "1" of an inferred state may be established as the representative state information, as shown in operation S1203.

Also, when the two pieces of state information do not correspond to each other, i.e. when different states are shown, state information including higher reliability from among the reliability "1" and the reliability "2" included in the state information "1" and the state information "2" may be established as the representative state information of the apparatus, as shown in operations S1204 and S1205.

The apparatus may recognize a surrounding state via the representative state information established via the above process.

According to an exemplary embodiment of the present invention, there is provided a method of recognizing a surrounding state, which can perform simple state recognition using unique information of a peripheral device (e.g. a type, a model name, a model number, a serial number, a manufacturer, a production year, an owner, an identifier, and the like). Also, according to an exemplary embodiment of the present invention, there is provided a method of recognizing a surrounding state, which can obtain detailed information with respect to a peripheral device from either a web page or an RFID-based database connected to the peripheral device via unique information, thereby increasing accuracy of state recognition.

The above-described exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts.

Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like.

Examples of program instructions include both machine code, such as that produced by a compiler, and files containing higher level code that may be executed by the computer using an interpreter. The described hardware devices may be configured to act as one or more software modules in order to perform the operations of the above-described exemplary embodiments of the present invention.

According to an exemplary embodiment of the present invention, there is provided an apparatus and method of recognizing a surrounding state, which can perform simple state recognition using unique information of a peripheral device (e.g. a type, a model name, a model number, a serial number, a manufacturer, a production year, an owner, an identifier, and the like).

According to an exemplary embodiment of the present invention, there is provided an apparatus and method of recognizing a surrounding state, which can obtain detailed information with respect to a peripheral device from either a web page or an RFID-based database connected with the peripheral device via unique information, thereby increasing accuracy of state recognition.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for recognizing a surrounding state, the apparatus comprising:
a unique information obtaining unit which obtains, from a peripheral device, unique information of the peripheral device; and
a surrounding state determining unit which determines a surrounding state, based on the obtained unique information;
wherein the unique information obtaining unit comprises a detailed information obtaining unit which obtains, via the unique information, detailed information of the peripheral device, and
wherein the surrounding state determining unit redefines the unique information, based on the detailed information, and determines the surrounding state, based on redefined unique information.

2. The apparatus of claim 1, wherein the unique information obtaining unit comprises a radio frequency identification (RFID) reader, and
wherein the RFID reader obtains the unique information via an RFID tag included in the peripheral device.

3. The apparatus of claim 1, wherein the unique information obtaining unit comprises a wired/wireless communication module, and
wherein the wired/wireless communication module obtains the unique information via the wired/wireless communication module included in the peripheral device.

4. The apparatus of claim 1, wherein the detailed information obtaining unit obtains, via the unique information, the detailed information using one of a web page and an RFID-based database connected with the peripheral device.

5. The apparatus of claim 1, wherein the unique information comprises at least one of a type of the peripheral device, a model name, a model number, a serial number, a manufacturer, a production year, an owner, and an identifier.

6. The apparatus according to claim 1, wherein the surrounding state is a location of the peripheral device.

7. The apparatus according to claim 1, wherein the surrounding state is an area surrounding the peripheral device.

8. The apparatus according to claim 1, wherein the unique information is redefined when the unique information is changed.

9. The apparatus according to claim 1, wherein the unique information obtaining unit and the surrounding state determination unit are in a first device.

10. The apparatus according to claim 9, wherein the peripheral device is external to the first device.

11. A surrounding state recognition method of recognizing a surrounding state in a device, the method comprising:
obtaining unique information from a peripheral device;
obtaining via the unique information, detailed information of the peripheral device;
determining a surrounding state, based on the unique information obtained from the peripheral device; and redefining the unique information, based on the detailed information, and determining the surrounding state, based on redefined unique information.

12. The method of claim 11, wherein the peripheral device comprises an RFID tag, and
wherein the obtaining unique information obtains, via an RFID reader, the unique information included in the RFID tag.

13. The method of claim 11, wherein the peripheral device comprises a wired/wireless communication module, and
wherein the obtaining unique information obtains the unique information using the wired/wireless communication module.

14. The method of claim 11, wherein the obtaining detailed information and the redefining the unique information obtains the detailed information using one of a web page and an RFID-based database connected to the peripheral device via the unique information, and redefines the unique information via the detailed information and the unique information.

15. The method of claim 11, wherein the unique information comprises at least one of a type of the peripheral device, a model name, a model number, a serial number, a manufacturer, a production year, an owner, and an identifier.

16. A computer-readable recording medium encoded with a program configured to cause a processor to implement a surrounding state recognition method of recognizing a surrounding state in a device, the method comprising:
obtaining unique information from a peripheral device;
obtaining via the unique information, detailed information of the peripheral device;
determining a surrounding state, based on the unique information obtained from the peripheral device; and
redefining the unique information, based on the detailed information, and determining the surrounding state, based on redefined unique information.

* * * * *